(12) United States Patent
Burrell et al.

(10) Patent No.: US 8,332,508 B1
(45) Date of Patent: Dec. 11, 2012

(54) EXTENSIBLE MANAGEMENT SERVER

(75) Inventors: Brandon Burrell, Suwanee, GA (US); Bakka Ravinder Reddy, Norcross, GA (US); Joseprabu Inbaraj, Lawrenceville, GA (US); Sanjoy Maity, Snellville, GA (US)

(73) Assignee: American Megatrends, Inc., Norcross, GA (US)

( * ) Notice: Subject to any disclaimer, the term of this patent is extended or adjusted under 35 U.S.C. 154(b) by 643 days.

(21) Appl. No.: 12/559,829

(22) Filed: Sep. 15, 2009

(51) Int. Cl.
*G06F 15/173* (2006.01)
(52) U.S. Cl. ............................................. 709/224
(58) Field of Classification Search .................. 709/224
See application file for complete search history.

(56) References Cited

U.S. PATENT DOCUMENTS

| | | | | |
|---|---|---|---|---|
| 5,872,931 | A * | 2/1999 | Chivaluri | 709/223 |
| 7,194,533 | B1 * | 3/2007 | DeLuca | 709/224 |
| 2005/0278708 | A1 * | 12/2005 | Zhao et al. | 717/136 |
| 2006/0005000 | A1 * | 1/2006 | King et al. | 713/1 |
| 2010/0106819 | A1 * | 4/2010 | Demir et al. | 709/224 |
| 2010/0332622 | A1 * | 12/2010 | Carolan et al. | 709/220 |

* cited by examiner

*Primary Examiner* — Larry Donaghue
(74) *Attorney, Agent, or Firm* — Morris Manning & Martin, LLP; Tim Tingkang Xia, Esq.

(57) ABSTRACT

An extensible management server (XMS) is disclosed that includes a management interface, a scripting engine, and a data store having management scripts and a management class library stored therein. The management interface provides functionality for receiving and responding to commands received from a management application to execute management scripts, add management scripts, delete management scripts, edits management scripts, and provide a listing of management scripts. The management scripts include functionality for retrieving and setting management data on managed computers. The management scripts are configured to utilize classes contained in the management class library to perform the actual interaction with the managed server computers for retrieving or setting management data.

23 Claims, 7 Drawing Sheets

EXTENSIBLE MANAGEMENT SERVER

BACKGROUND

Computers are often linked together through networks to allow the resources of a computer at one location to be utilized by other computers located at different locations. In a distributed environment such as this, computers known as servers often perform various tasks for other computers that communicate with the servers over a network. For instance, a server might enable sharing of files and other resources between the server and other computers, such as a World Wide Web ("web") server that provides text, graphics, and other resources to client computers over the Internet.

It is often necessary to manage the operation of one or more server computers. For instance, it is often desirable to view management data that provides information regarding the health, operation, or status of a server computer. This is especially true for server computers that maintain resources that are utilized by a large number of client computers or other server computers, such as within a corporate network or the Internet. For many conventional systems, the technician that needs to interact with the servers being managed is required to be physically located at the site of the server. However, it is not always feasible for a technician to be physically present at the location of a server computer.

For example, a system administrator of a corporate network may be present at one location while the servers of the corporate network may be spread around the country or even the globe. To effectively manage the servers on the corporate network, the system administrator must be able to monitor each of the server computers, regardless of their location. Because the system administrator cannot be physically present at each server to be managed, effective management of the server computers becomes very difficult. As a result, it can be very costly to maintain servers located in disparate physical locations.

Some server computers include an integrated or add-in management device that can provide remote access to management data regarding the health, operation, or status of a managed server computer. However, retrieving desired management data from one or more server computers is still a complex and time consuming process for many system administrators. Moreover, it can be very difficult for a system administrator to customize the particular server computers from which management data should be retrieved and the desired management data to be retrieved.

It is with respect to these and other considerations that the disclosure presented herein has been made.

SUMMARY

Technologies are provided herein for an extensible management server ("XMS"). In particular, the XMS and related components presented herein allow a system administrator or other user to define and utilize scripts to retrieve management data from one or more managed server computers. A system administrator can define management scripts that retrieve specific management data from specific managed server computers, thereby providing a great deal of power and flexibility. In order to enable this functionality, the scripts can call classes contained in a management class library for retrieving and setting management data at the managed server computers. Data returned by the scripts can then be provided to a user through a user interface provided by a management application program.

According to one embodiment, a system is provided herein for executing scripts to retrieve and set management data at one or more managed server computers. The system includes a management application configured for execution on a client computer or another type of computing system. The system also includes an XMS configured with a management interface, a scripting engine, and a data store having management scripts and a management class library stored therein. The management scripts include functionality for retrieving and setting management data on the managed server computers. The management scripts are configured to utilize classes contained in the management class library to perform the actual interaction with the managed server computers for retrieving or setting management data. As discussed above, management data relates to data regarding the health, operation, or status of a managed computer.

According to embodiments, the management interface is configured to receive requests from the management application for executing management scripts contained in the data store, adding new management scripts to the data store, deleting management scripts from the data store, listing the scripts in the data store, retrieving management scripts stored in the data store, and for performing other functions. In response to receiving these requests, the management interface is configured to perform the desired functionality. For instance, the management application may make a call to the management interface for retrieving a listing of the available management scripts. In response to receiving such a request, the management interface generates a listing of the management scripts in the data store and provides the listing to the management application in response to the request. The management application may then display the listing in an appropriate user interface.

A user may then select a script from the listing for editing. In response thereto, the management application sends a request to retrieve the selected script to the management interface. In response, the management interface provides the requested script to the management application. The script may then be edited by the user in a user interface provided by the management application or in another program.

When the user is done editing the management script, the management application may be utilized to upload the edited script to the XMS. If a user requests to execute a script, the management application transmits a request to the management interface to execute the script. In response thereto, the management interface utilizes a scripting engine to execute the script. As discussed briefly above, a management script may utilize classes stored in a management class library for interacting with the management data of managed server computers. When the script execution has completed, a success or failure message may be returned to the management application and displayed to a user in an appropriate user interface.

According to embodiments, the management class library includes classes for obtaining management data from an event log stored at a managed computer system, classes for obtaining management data regarding a field replaceable unit ("FRU") of a managed computer system, classes for obtaining management data regarding a power supply in a managed computer system, and classes for obtaining management data regarding a cooling component, like a fan, of a managed computer system. Other types of classes may also be provided. In one embodiment, the application programming interface ("API") exposed by the management class library resembles the device and data model being managed by the XMS.

It should be appreciated that the above-described subject matter may also be implemented as a computer-controlled apparatus, a computer process, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing an extensible management server ("XMS"). In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments disclosed herein.

Figure 1:
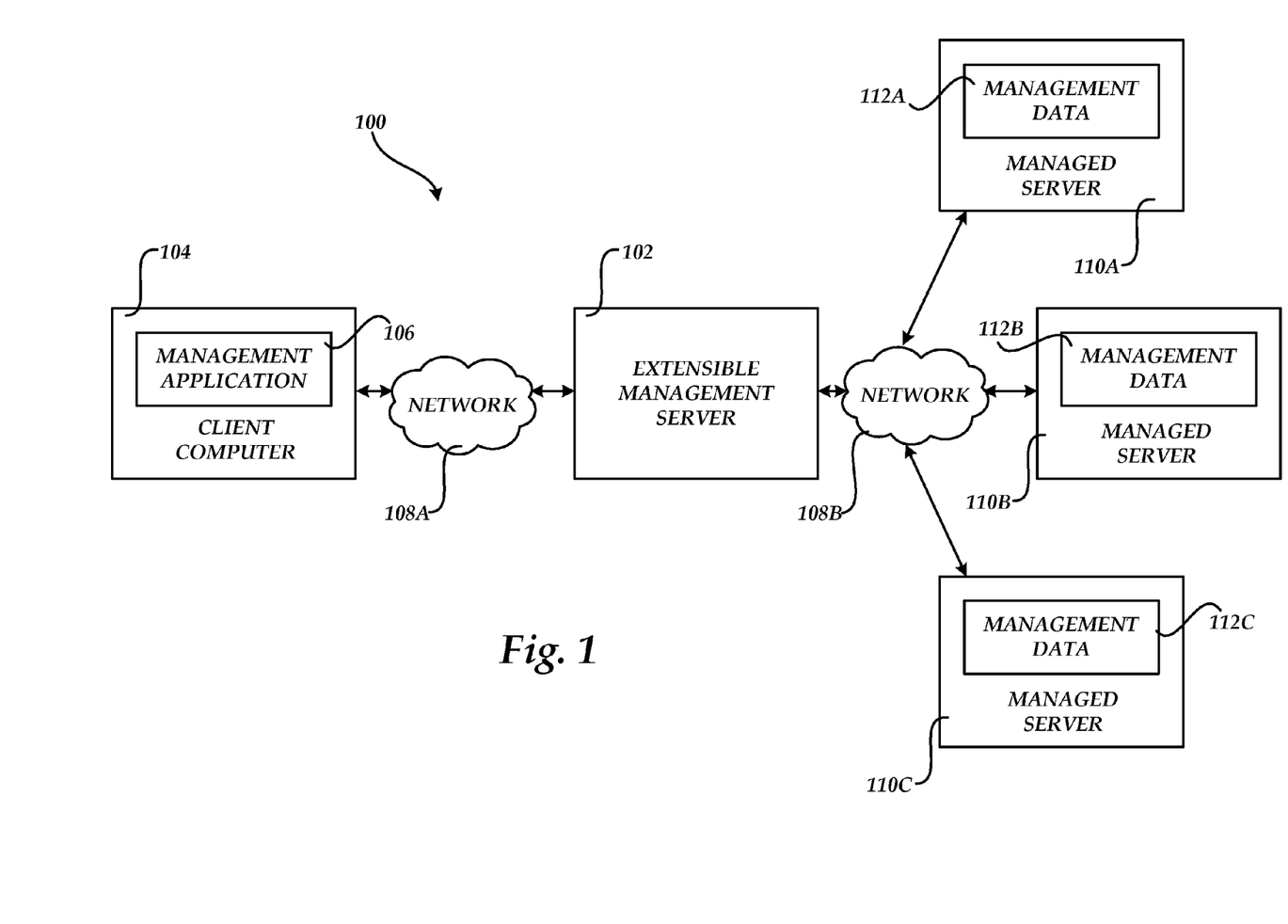
FIG. 1 is a computer network diagram showing aspects of a client computer, an extensible management server, and several managed server computers discussed herein.

FIG. 1 is a computer network diagram showing aspects of a client computer, an extensible management server, and several managed server computers discussed herein. As will be discussed in greater detail herein, the XMS 102 provides functionality for retrieving, setting and otherwise interacting with management data 112A-112C located at one or more managed servers 110A-110C. It should also be appreciated that the functionality presented herein may also be utilized to retrieve management data from the XMS 102 itself. In order to provide the functionality described herein, the XMS 102 is connectively coupled to the managed servers 110A-110C through a network, such as the network 108B. It should be appreciated that the network architecture illustrated in FIG. 1 and described herein has been simplified and that more or fewer networks may be utilized to connect the XMS 102 and the managed servers 110A-110C. It should also be appreciated that while three managed servers 110A-110C have been illustrated in FIG. 1, more or fewer servers may be managed in the manner presented herein.

As also shown in FIG. 1, the XMS 102 is also coupled to a client computer 104 via a network 108A. The client computer 104 is configured to execute a management application 106 for interacting with the XMS 102 and controlling its operation. In particular, as will be described in greater detail below, the management application 106 provides a user interface to a user of the client computer 104 through which commands may be received for performing functions at the XMS 102. For instance, through the management application 106, a user of the client computer 104 may request to execute scripts for retrieving the management data 112A-112C from the managed servers 110A-110C, respectively. As discussed briefly above, the management data 112A-112C refers to data having to do with the health, operation, or status of a managed computer.

In some applications, the XMS 102 and the managed servers 110A-110C may also include hardware or software for receiving and responding to requests for the management data 112A-112C. For instance, in one implementation, the XMS 102 and the managed servers 110A-110C include a baseboard management controller ("BMC"). A BMC is a microcontroller that monitors the health, operation, and status of a computer. In one implementation, a BMC monitors health related aspects associated with a computer such as the temperature of components within the computer, the speed of rotational components within the computer, such as spindle motors, fans, and the like, the voltage across or applied to one or more components within a computer, and the available or used capacity of memory devices within the computer. A BMC may also monitor the lifespan of a FRU within a computing system, the power status of a computing system, and data regarding the operation of a cooling component, such as an active or passive cooling device. Other parameters may also be monitored by a BMC.

In order to make the management data gathered by a BMC available to programs in other computer systems, such as the XMS 102, a standard called the Intelligent Platform Management Interface ("IPMI") has been created. IPMI is an industry standard for system monitoring and event recovery. The IPMI specification provides a common message based interface for accessing management data regarding many components within a managed computing system. In general, IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through the network connections illustrated in FIG. 1.

According to one embodiment, the managed servers 110A-110C and the XMS 102 are IPMI compliant computing systems. In this manner, the XMS 102 can request the management data 112A-112C from the managed servers 110A-110C, respectively, through the use of the IPMI compliant protocols. In this regard, it should be appreciated that because the managed servers 110A-110C are IPMI compliant, no additional software must be installed at the managed servers 110A-110C in order to retrieve the management data 112A-112C. It should also be appreciated that although the embodiments presented herein are described in the context of IPMI, other platform management interfaces may be utilized by the various embodiments presented herein. Additional details regarding the operation of the management application 106 and the XMS 102 are provided below with reference to FIGS. 2-7.

Figure 2:
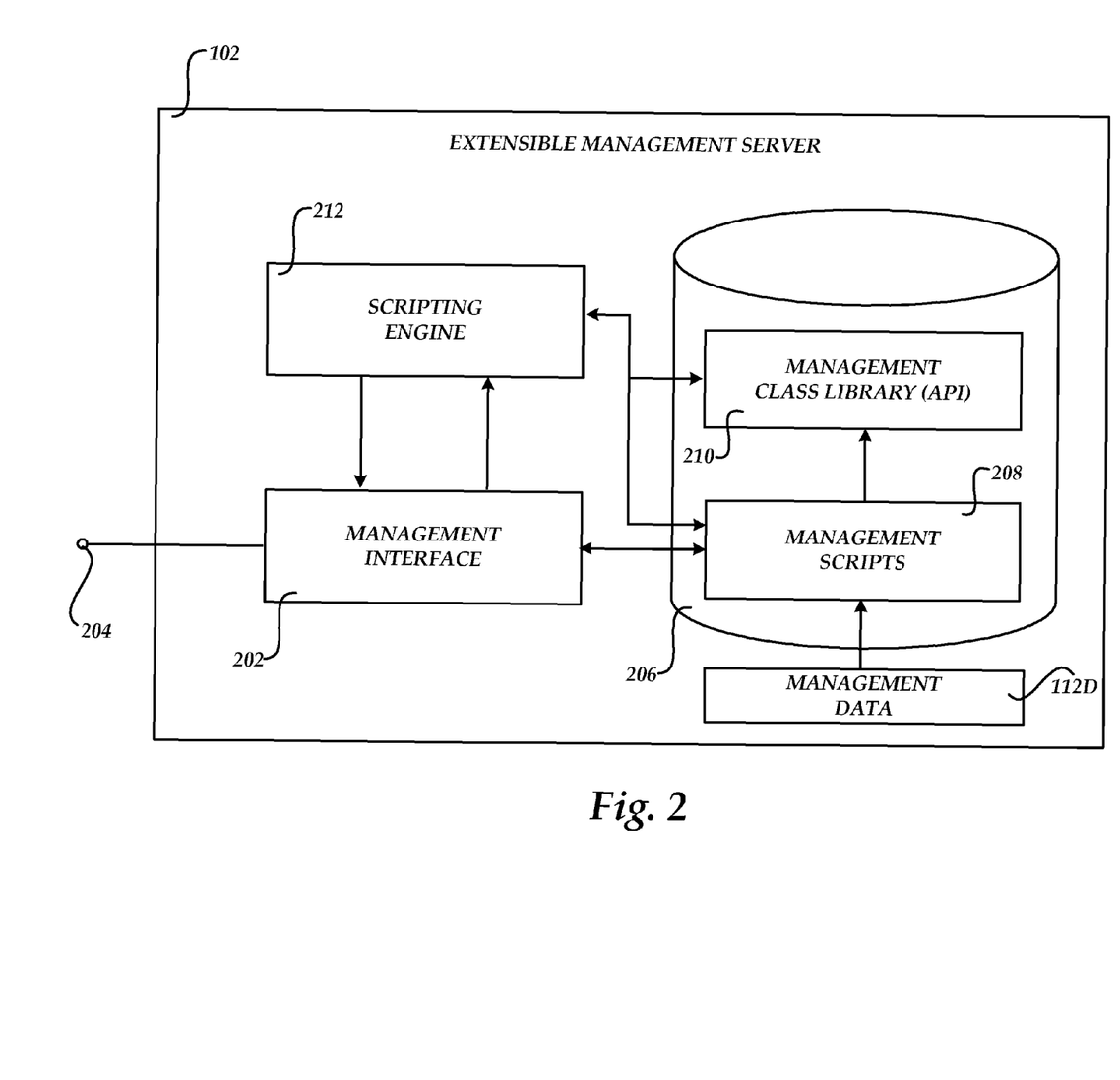
FIG. 2 is a software architecture diagram showing aspects of an extensible management server presented in one embodiment disclosed herein.

FIG. 2 is a software architecture diagram showing aspects of an XMS 102 presented in one embodiment disclosed herein. In particular, as shown in FIG. 2, the XMS 102 includes a management interface 202 that provides an interface 204 to the management application 106. Through the interface 204, the management application 106 can interact with the XMS 102. In particular, according to one embodiment, the interface 204 allows the management application 106 to request that the XMS 102 execute a management script. As shown in FIG. 2, the management scripts 208 are stored in a data store 206. In response to receiving such a request from the management application 106 on the interface 204, the management interface 202 is configured to retrieve the management script 208 from the data store 206 and to cause a scripting engine 212 to execute the specified management script 208. Additional details regarding the process of executing a management script 208 will be provided below.

According to other embodiments, the management interface 202 also provides functionality through the interface 204 for allowing the management application 106 to add a new management script 208 to the data store 206, to delete a management script 208 from the data store 206, to retrieve a listing of the management scripts 208 in the data store 206, and to retrieve a management script 208 from the data store 206. The management interface 202 may also expose other functionality on the interface 204 for use by the management application 106.

It should be appreciated that, according to an embodiment, the management interface 202 comprises a communication layer that allows the management application 106 to access the management scripts 208 stored at the XMS 102. For example, in one embodiment, the management interface 202 may be implemented using PHP. In this regard, the management application 106 may comprise a Web browser application configured for communication with the management interface 202. Alternatively, the management application 106 may comprise a standard desktop application program for use specifically with the management interface 202. Other implementations should be apparent to those skilled in the art.

It should be appreciated that the management application 106 provides a user interface for interacting with the management interface 202 described above. For instance, the management application 106 may provide an appropriate user interface for allowing the user to perform the functions described above for executing management scripts, adding new management scripts, deleting management scripts, retrieving management scripts, and receiving a listing of management scripts. In this regard, when a management script 208 is executed, the management application 106 may provide an appropriate user interface for receiving input parameters to the management script to be executed. These parameters may be transmitted to the management interface 202 and utilized during the execution of the management script. A management script 208 may also generate text output during execution or a result code upon completion. This data may also be returned to the management application 106 by the management interface 202 and displayed to a user of the client computer 104 through an appropriate user interface.

As discussed briefly above, the management scripts 208 provide functionality for retrieving, setting, and otherwise interacting with the management data 112A-112C stored at the servers 110A-110C, respectively. The management scripts 208 may be expressed utilizing a standard scripting language, such as PHP or JAVASCRIPT. Alternatively, a custom scripting language may be defined for use in the manner presented herein.

According to embodiments, the management scripts 208 utilize classes exposed by the management class library 210. The management class library 210 includes one or more classes for obtaining the management data 112A-112C. For instance, according to embodiments, the management class library 210 includes classes for obtaining management data 112 from an event log of one of the one or more managed servers 110A-110C, classes for obtaining management data 112A-112C regarding a FRU of one of the managed servers 110A-110C, classes for obtaining management data 112A-112C regarding power supplies of the managed servers 110A-110C, and classes for obtaining management data 112A-112C regarding cooling components of the managed servers 110A-110C. It should be appreciated that the management class library 210 may also expose classes for obtaining other types of management data 112 from the servers 110A-110C.

The management scripts 208 may reference the classes exposed by the management class library 210 in order to retrieve, set, and otherwise utilize the management data 112A-112C exposed by the managed servers 110A-110C, respectively. As discussed briefly above, the XMS 102 may also expose management data 112D. The management scripts 208 may similarly utilize the management class library 210 to retrieve the management data 112D from the XMS 102 itself.

According to embodiments, the management scripts 208, in conjunction with the classes exposed by the management class library 210, provide functionality for reading management data 112 regarding server chassis, blades, monolithic servers, and chassis slot maps. The management scripts 208 also provide functionality for reading management data 112 regarding IPMI sensors and event logs for open blade system management specification ("OBSM")/IPMI devices. The management scripts 208 also provide functionality for reading OBSM power and cooling domains, power supply, and fan information regarding the managed servers 110A-110C. The management scripts 208 also provide functionality for device power control when used in conjunction with certain managed servers. For instance, the management scripts 208, when utilized in conjunction with the management class library 210 may provide functionality for powering off, power resetting, or otherwise setting the power state of the managed server computers 110A-110C. The management scripts 208 may also provide functionality for reading device FRU records. In order to facilitate these operations, the management scripts 208 may also provide functionality for manipulating a database stored at the XMS 102. For instance, functionality may be provided for creating and manipulating databases and tables, and for adding, deleting, and manipulating data stored within the database. It should be appreciated that the above examples are merely illustrative, and that the management scripts 208 when utilized in conjunction with the management class library 210 may provide functionality for retrieving, setting, and otherwise interacting with virtually any type of management data 112A-112C exposed by the managed servers computers 110A-110C. Additional details regarding the operation of the management application 106, the management interface 202, and the management scripts 208 will be provided below with respect to FIGS. 3-7.

Figure 3:
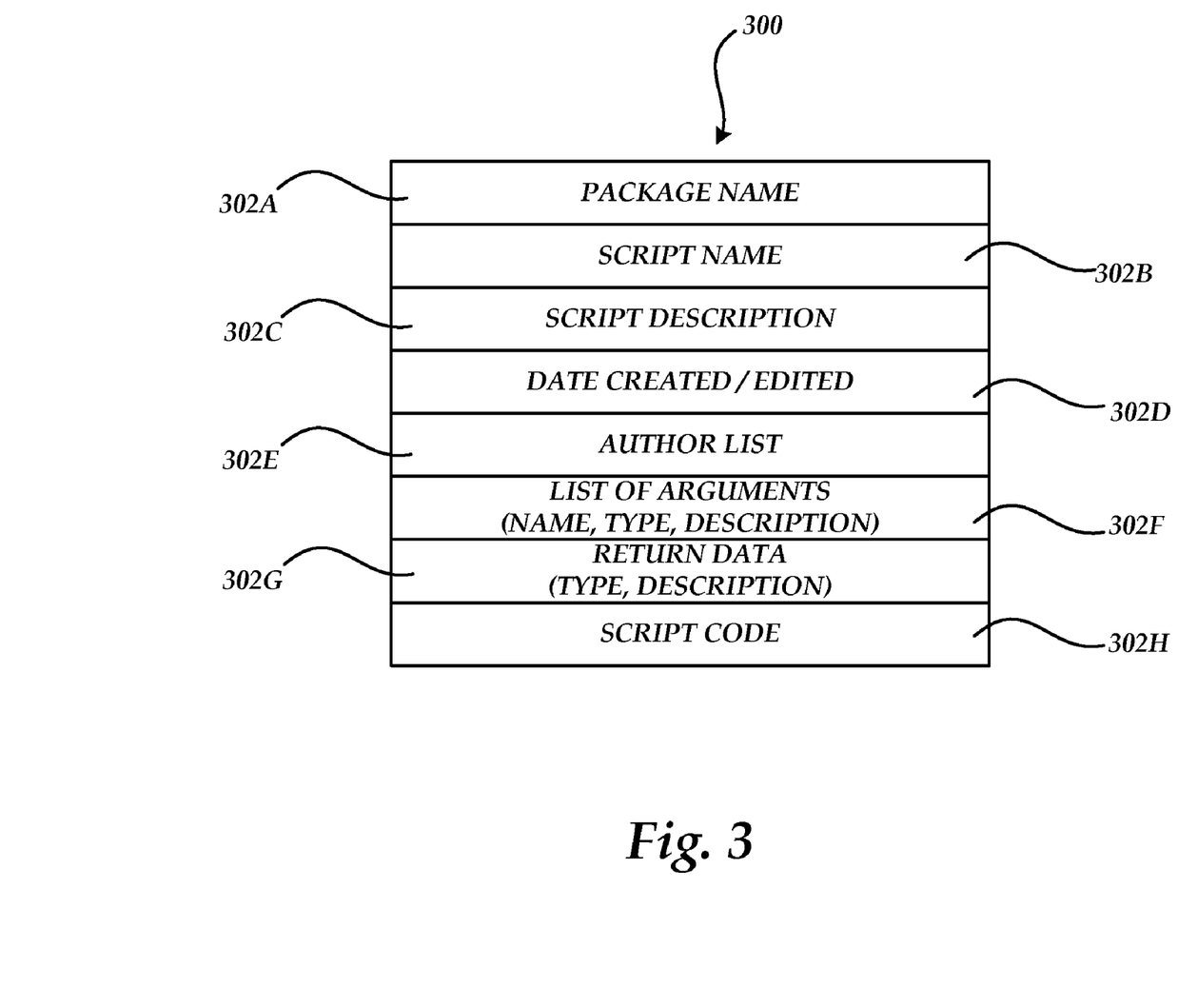
FIG. 3 is a data structure diagram showing one illustrative configuration for a management script utilized in the embodiments presented herein.

FIG. 3 is a data structure diagram showing one illustrative configuration for a management script utilized in the embodiments presented herein. In particular, FIG. 3 shows an illustrative configuration for a package 300 utilized to embody one of the management scripts 208. In one embodiment, the management scripts 208 are organized into packages, such as the package 300 shown in FIG. 3, based upon their relevance.

In the example package 300, a first data field 302A includes a package name. The data field 302B includes text identifying the name of the management script 208 contained in the package 300. The data field 302C includes a text description of the management script 208. The data field 302D includes date information identifying the date that the management script 208 was created or last edited. The data field 302E identifies the authors of the management script 208. The data field 302F identifies a list of arguments taken by the management script 208. The data field 302G identifies the data returned by the management script 208. The data field 302H is utilized to stored the actual script code for the management script 208. It should be appreciated that the package layout illustrated in FIG. 3 is merely illustrative and that other formats may be utilized to store the management scripts 208 in the data store 206.

Figure 4:
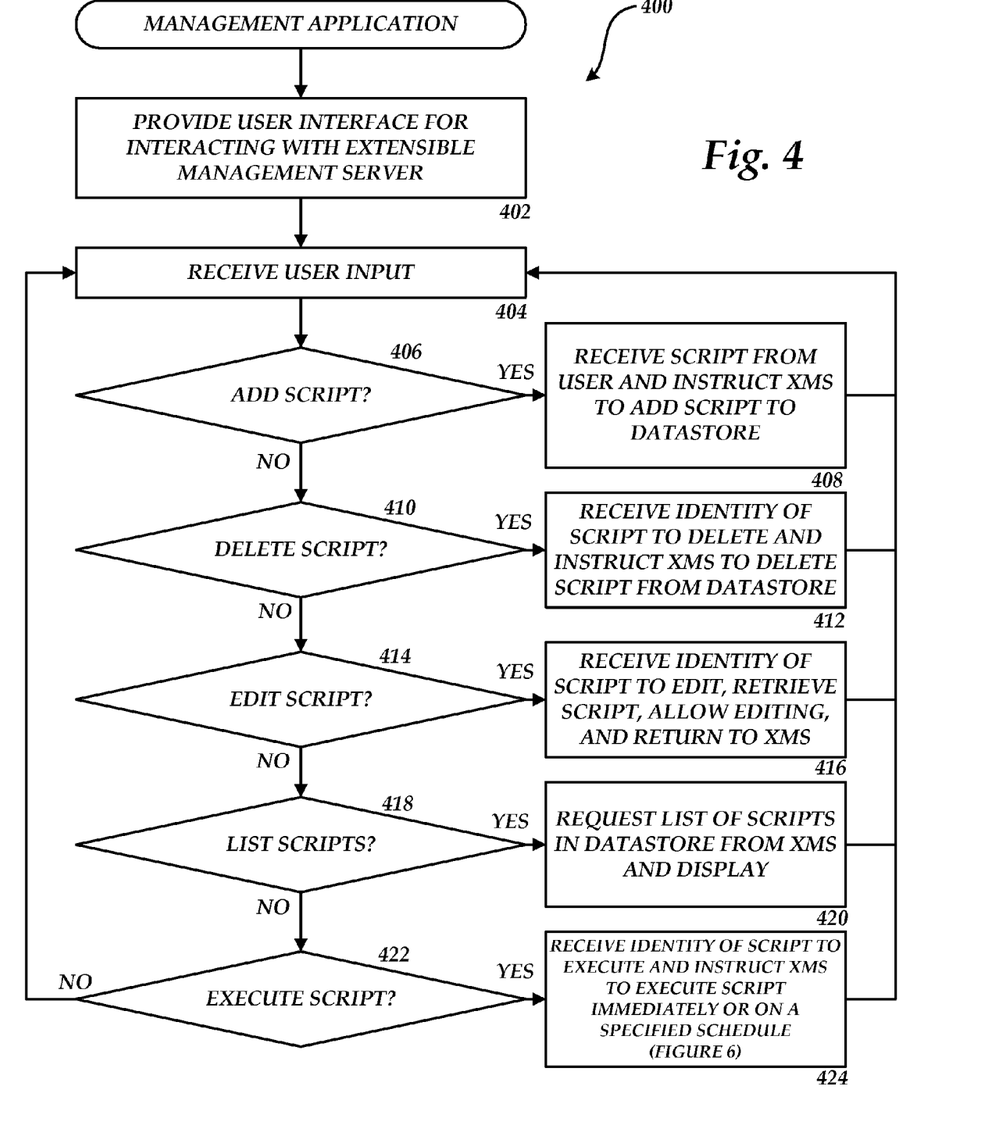
FIG. 4 is a flow diagram illustrating aspects of the operation of a management application provided in one embodiment disclosed herein.

FIG. 4 is a flow diagram illustrating aspects of the operation of a management application provided in one embodiment disclosed herein. In particular, FIG. 4 is a flow diagram illustrating a routine 400 that shows the operation of the management application 106 which, as discussed briefly above, provides a user interface to a user of the client computer 106 for interacting with the XMS 102.

It should be appreciated that the logical operations described herein with respect to the various figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where the management application 106 provides a user interface for a user of the client computer 104 to submit commands to the XMS 102. As discussed above, the user interface provided by the management application 106 may provide choices for allowing a user to add a script to the data store 206, to delete a script for the data store 206, to edit a script stored in the data store 206, to list the scripts stored in the data store 206, and to execute a script stored in the data stored 206. In this regard, the management application 106 may also provide a user interface for allowing a user of the client computer 104 to schedule the execution of a script stored in the data store 206. The management interface 202 and the scripting engine 212 may provide functionality for executing the specified scripts according to the defined schedule.

From operation 402, the routine 400 proceeds to operation 404, where user input is received at the management application 106. In response to user input being received through the user interface provided by the management application 106, the routine 400 proceeds from operation 404 to operation 406. At operation 406, the management application 106 determines whether a request has been received from a user of the client computer 104 to add a script to the data store 206. If so, the routine 400 proceeds from operation 406 to operation 408, where the script to be added to the data store 206 is identified by a user of the client computer 104. Once the script to be added to the data store 206 has been identified, the management application 106 transmits an instruction to the management interface 202 to add the specified script to the data store 206. In response thereto, the management interface 202 adds the script to the data store 206 and returns a success or failure code to the management application 106. From operation 408, the routine 400 returns to operation 404, discussed above.

If, at operation 406, the management application 106 determines that the user input was not for requesting that a script be added to the data store 206, the routine 400 proceeds from operation 406 to operation 410. At operation 410, the management application 106 determines whether a request was received from a user of the client computer 104 to delete a script stored in the data store 206. If so, the routine 400 proceeds from operation 410 to operation 412, where the identity of the script to be deleted from the data store 206 is received from a user of the client computer 104. The management application 106 then transmits an instruction to the management interface requesting that the specified script be deleted from the data store 206. The management interface 202 attempts to delete the specified script from the data store 206 and returns a result code to the management application 106. From operation 412, the routine 400 returns to the operation 404, discussed above.

If, at operation 410, it is determined that a request to delete a script was not received, the routine 400 proceeds from operation 410 to operation 414. At operation 414, a determination is made by the management application 106 as to whether a user of the client computer 104 has requested to edit a script stored in the data store 206. If so, the routine 400 proceeds from operation 414 to operation 416, where the management application 106 receives the identity of the script to be edited. The management application 106 then sends an instruction to the management interface 202 to retrieve the specified script from the data store 206. In response thereto, the management interface 202 retrieves the specified script from the data store 206 and returns the script to the management application 106. The management application 106 then permits editing of the script within a user interface provided by the management application 106 or within another program. Once editing of the script has been completed, the management application 106 may instruct the management interface 202 to add the edited script to the data store 206 in the manner described above. From operation 416, the routine 400 returns to operation 404, described above.

If, at operation 414, it is determined that a request to edit a script was not received, the routine 400 proceeds to operation 418. At operation 418, the management application 106 determines whether a request to list the management scripts 208 stored in the data store 206 has been received. If so, the management application 106 transmits a request to the management interface 202 requesting the list of management scripts 208 in the data store 206. In response thereto, the management interface 202 generates a listing of the available management scripts 208 and returns the listing to the management application 106. The management application 106 may then display the listing of scripts to a user of the client computer 104 through an appropriate user interface. As discussed above, a user may select a script from the listing of scripts for editing, execution, or deletion. From operation 420, the routine 400 returns to operation 404, discussed above.

If, at operation 418, the management application 106 determines that a request to list the available management scripts 208 was not received, the routine 400 proceeds from operation 418 to operation 422. At operation 422, the management application 106 determines whether a request was received from a user of the client computer 104 to execute a script in the data store 206 immediately or on a schedule. If not, the routine 400 returns to operation 404, discussed above. If so, the routine 400 proceeds to operation 424, where the management application 106 receives the identity of the script to be executed and instructs the management interface 202 to execute the specified script immediately or on a schedule specified by the user. An illustrative routine for illustrating the execution of one of the management scripts 208 is discussed in greater detail below with reference to FIG. 6. From operation 424, the routine 400 returns to operation 404, discussed above.

Figure 5:
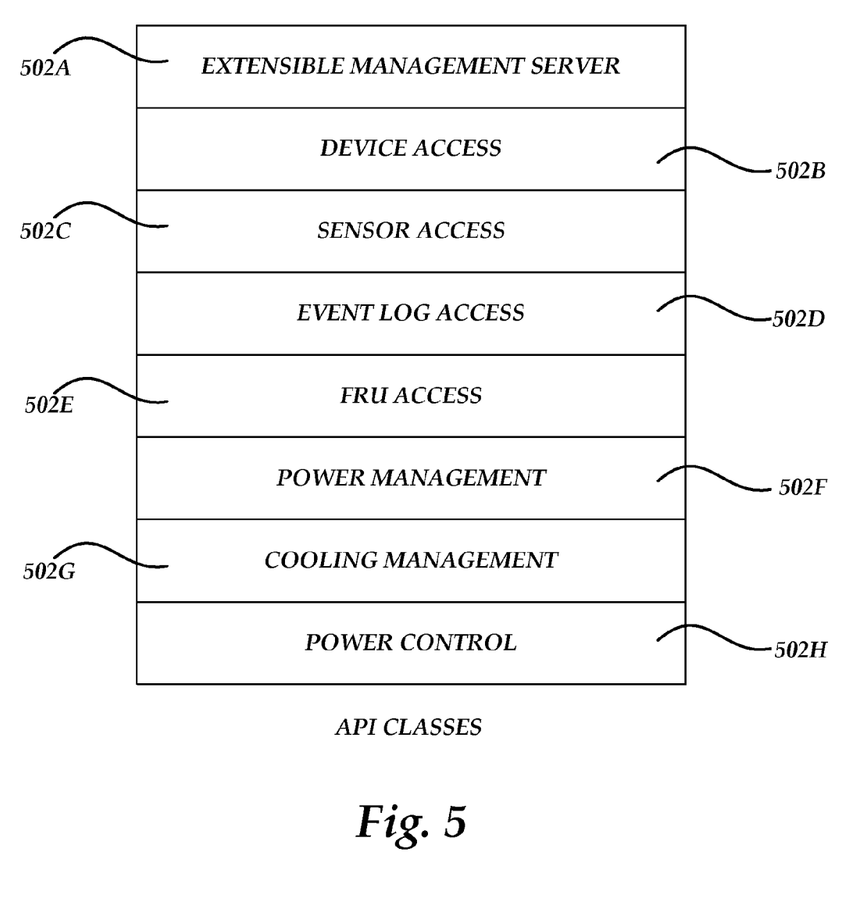
FIG. 5 is a data structure diagram showing aspects of several application programming interface ("API") classes provided in one embodiment by a management class library disclosed herein.

FIG. 5 is a data structure diagram showing aspects of several application programming interface ("API") classes provided in one embodiment by a management class library disclosed herein. In particular, the XMS class 502A provides classes for obtaining handles that are used to access a particular device. For instance, the XMS class 502A may provide functions for obtaining a handle to a database, a device, a sensor, an event log, a FRU component, power control, OBSM power management, OBSM cooling management and others.

Once a handle has been obtained through the use of the XMS class 502A, these handles can be utilized to actually access the device info for a particular device. For instance, the device access class 502B provides functions for getting a device with a given device identifier, getting a device with a given IP address, getting a list of devices of a given type, getting a device list that illustrates a device parent-child relationship, getting chassis modules, including a list of blade servers or other components in a chassis, and obtaining a chassis slot map.

The sensor access class 502C provides classes for getting device SDR information, getting the sensors for a given device, and getting the sensors for a given device with provided sensor key fields. The event log access class 502D provides classes for getting a device system event log information, getting device event log records as a list, deleting a system event log record for a given device, and clearing a system event log database for a given device.

The FRU access class 502E provides functionality for getting FRU records for a given device and getting a FRU record with given key values. The power management class 502F provides functionality for getting the power supply information for a given chassis, getting a list of power supplies in a power domain, and obtaining a list of devices in a power domain. The cooling management class 502G provides functionality for getting cooling domains consisting of fans that provide cooling and components/devices/slots. The cooling management class 502G also provides functionality for getting a list of all fans in a given chassis, getting a list of fans in a cooling domain, and getting a list of devices in a cooling domain. The power control class 502H provides functionality for resetting a target device, obtaining an ACPI power state, and setting an ACPI power state. It should be appreciated that the API classes illustrated in FIG. 5 and described above are merely illustrative and other classes may also be provided in the embodiments presented herein.

Figure 6:
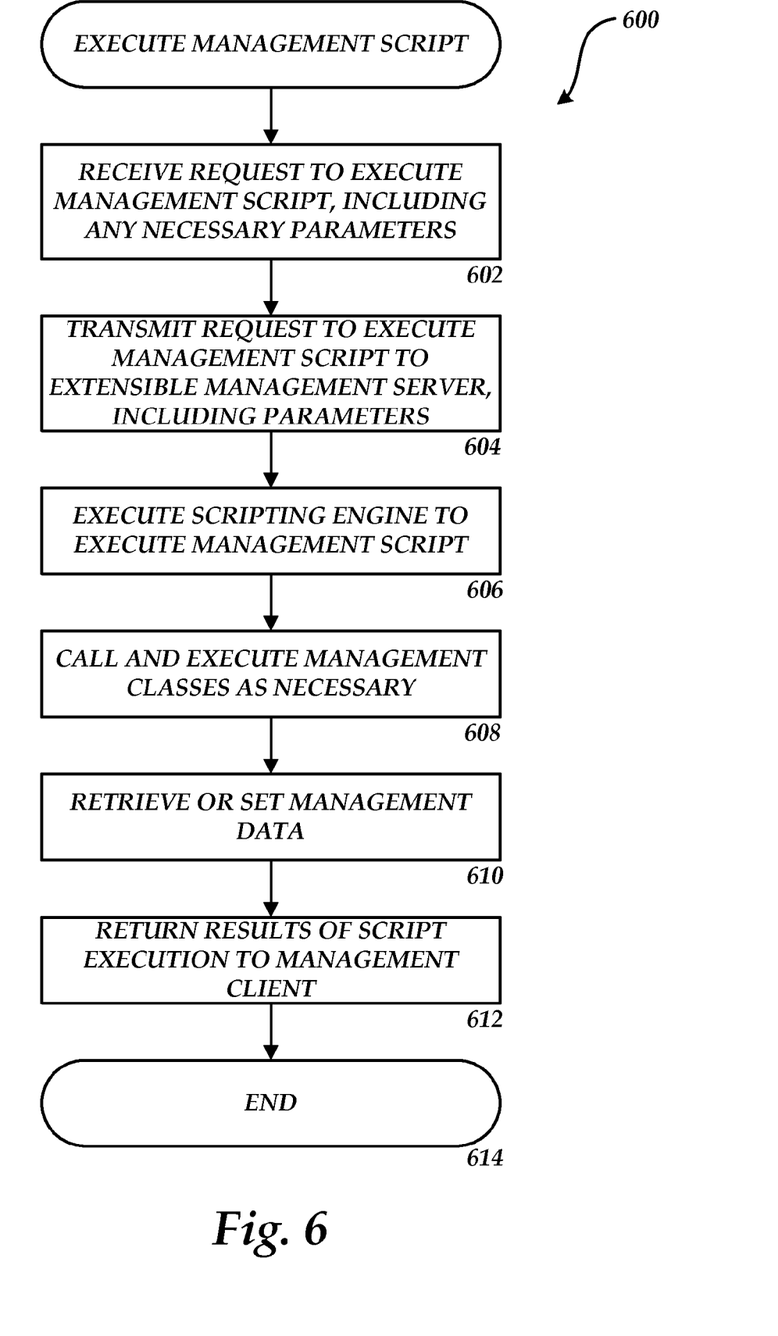
FIG. 6 is a flow diagram illustrating aspects of one exemplary process presented herein for executing a management script at an extensible management server presented herein in one embodiment.

FIG. 6 is a flow diagram illustrating aspects of one exemplary process presented herein for executing a management script at an extensible management server presented herein in one embodiment. In particular, FIG. 6 shows an illustrative routine 600 illustrating aspects of the operation of a management script 208 by the XMS 102. The routine 600 begins at operation 602, where the management application 106 receives a request from a user of the client computer 104 to execute a management script 208 stored in the data store 206. The request received at the client computer 104 may also include any necessary parameters for execution of the specified management script 208. In response to receiving such a request, the routine 600 proceeds to operation 604, where the management application 106 transmits a request to the management interface 202 to execute the specified management script 208. The request transmitted to the management interface 202 includes any parameters necessary for execution of the management script 208.

From operation 604, the routine 600 proceeds to operation 606, where the management interface 202 retrieves the specified management script 208 to be executed and provides the script to the scripting engine 212 for execution. The scripting engine 212 receives the script 208 to be executed and begins execution of the script. In order to execute the management script 208 it may be necessary to call and execute classes stored in the management class library 210, in the manner discussed above. This occurs at operation 608. As also discussed above, the classes containing the management class library 210 implement functionality for retrieving or setting the management data 112A-112C on the managed servers 110A-110C. In this regard, the called classes in the management class library 210 perform their specified functions for retrieving, setting, or otherwise utilizing the management data 112. This occurs at operation 610.

Once the script has completed execution, any parameters returned by the script are provided to the management interface 202. In turn, the management interface 202 provides the results of the script execution to the management application 106. In response to receiving the results, the management application 106 may display the results of the script execution to a user of the client computer 104. This occurs at operation 612. From operation 612, the routine 600 proceeds to operation 614, where it ends.

Figure 7:
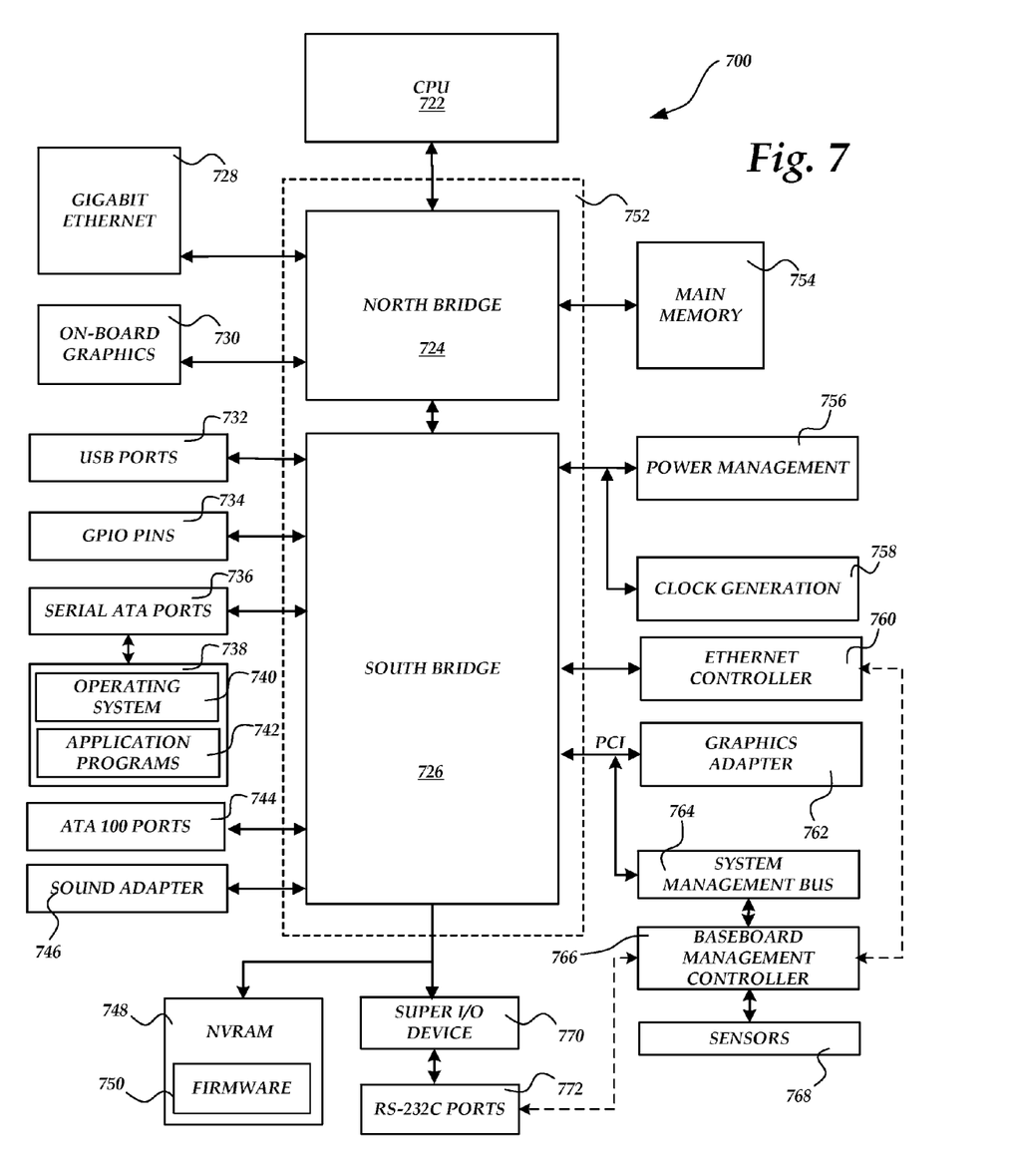
FIG. 7 is a computer architecture diagram showing an illustrative computer architecture that might be utilized to implement the various computing systems presented herein.

FIG. 7 and the following discussion are intended to provide a brief, general description of one suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

FIG. 7 shows an illustrative computer architecture that may be utilized to embody the various computing systems described herein. It should be appreciated that although the embodiments described herein are discussed in the context of server computers, virtually any type of computing device may be utilized. It should be appreciated that the computer architecture shown in FIG. 7 may be utilized to embody the client computer 104, the extensible management server 102, the managed servers 110A-110C, or any other computer system described herein.

The illustrative computer architecture shown in FIG. 7 is for a computer 700 that includes a baseboard, or "motherboard", which is a printed circuit board to which a multitude of components or devices may be connected by way of a system bus or other electrical communication path. In one illustrative embodiment, a CPU 722 operates in conjunction with a chipset 752. The CPU 722 is a standard central processor that performs arithmetic and logical operations necessary for the operation of the computer. The computer 700 may include a multitude of CPUs 722.

The chipset 752 includes a north bridge 724 and a south bridge 726. The north bridge 724 provides an interface between the CPU 722 and the remainder of the computer 700. The north bridge 724 also provides an interface to a random access memory ("RAM") used as the main memory 754 in the computer 700 and, possibly, to an on-board graphics adapter 730. The north bridge 724 may also include functionality for providing networking functionality through a gigabit Ethernet adapter 728. The gigabit Ethernet adapter 728 is capable of connecting the computer 700 to another computer via a network. Connections that may be made by the network adapter 728 may include LAN or WAN connections. LAN and WAN networking environments are commonplace in offices, enterprise-wide computer networks, intranets, and the Internet. The north bridge 724 is connected to the south bridge 726.

The south bridge 726 is responsible for controlling many of the input/output functions of the computer 700. In particular, the south bridge 726 may provide one or more universal serial bus ("USB") ports 732, a sound adapter 746, an Ethernet controller 760, and one or more general-purpose input/output ("GPIO") pins 734. The south bridge 726 may also provide a bus for interfacing peripheral card devices such as a graphics adapter 762. In one embodiment, the bus comprises a peripheral component interconnect ("PCI") bus. The south bridge 726 may also provide a system management bus 764 for use in managing the various components of the computer 700. Additional details regarding the operation of the system management bus 764 and its connected components are provided below.

The south bridge 726 is also configured to provide one or more interfaces for connecting mass storage devices to the computer 700. For instance, according to an embodiment, the south bridge 726 includes a serial advanced technology attachment ("SATA") adapter for providing one or more serial ATA ports 736 and an ATA 100 adapter for providing one or more ATA 100 ports 744. The serial ATA ports 736 and the ATA 100 ports 744 may be, in turn, connected to one or more mass storage devices storing an operating system 740 and application programs 742, such as the SATA disk drive 738. As known to those skilled in the art, an operating system 740 comprises a set of programs that control operations of a computer and allocation of resources. An application program is software that runs on top of the operating system software, or other runtime environment, and uses computer resources to perform application specific tasks desired by the user.

The mass storage devices connected to the south bridge 726, and their associated computer-readable media, provide non-volatile storage for the computer 700. Although the description of computer-readable media contained herein refers to a mass storage device, such as a hard disk or CD-ROM drive, it should be appreciated by those skilled in the art that computer-readable media can be any available media that can be accessed by the computer 700. By way of example, and not limitation, computer-readable media includes volatile and non-volatile, removable and non-removable media implemented in any method or technology for storage of information such as computer-readable instructions, data structures, program modules or other data. For instance, computer-readable media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 700.

A low pin count ("LPC") interface may also be provided by the south bridge 726 for connecting a "Super I/O" device 770. The Super I/O device 770 is responsible for providing a number of input/output ports, including a keyboard port, a mouse port, a serial interface 772, a parallel port, and other types of input/output ports. The LPC interface may also connect a computer-readable media such as a ROM or a flash memory such as the NVRAM 748 for storing a firmware 750 that includes program code containing the basic routines that help to start up the computer 700 and for transferring information between elements within the computer 700.

As described briefly above, the south bridge 726 may include a system management bus 764. The system management bus 764 may include a baseboard management controller ("BMC") 766. In general, the BMC 766 is a microcontroller that monitors operation of the computer system 700. In a more specific embodiment, the BMC 766 monitors health-related aspects associated with the computer system 700, such as, but not limited to, the temperature of one or more components of the computer system 700, speed of rotational components (e.g., spindle motor, CPU Fan, etc.) within the system, the voltage across or applied to one or more components within the system 700, and the available or used capacity of memory devices within the system 700. To accomplish these monitoring functions, the BMC 766 is communicatively connected to one or more components by way of the management bus 764. In an embodiment, these components include sensor devices for measuring various operating and performance-related parameters within the computer system 700.

The management bus 764 is used by the BMC 766 to request and/or receive various operating and performance-related parameters from one or more components, which are also communicatively connected to the management bus 764. For instance, in one embodiment, the management bus 764 may communicatively connect the BMC 766 to a CPU temperature sensor and a CPU fan (not shown in FIG. 7), thereby providing a means for the BMC 766 to monitor and/or control operation of these components. The BMC 766 may also include sensors 768 connected directly thereto.

The serial ports 772 and the Ethernet controller 760 may be utilized to establish a connection with the BMC 766. Through the use of the BMC 766, the sensors 768, and the system management bus 764, the computer 700 may collect the management data 112 discussed above and make this data available to requesting programs. The BMC 766 may also provide functionality for setting aspects of the management data 112 as discussed above, such as for instance resetting the computer 700 or setting the power state of the computer 700. As also discussed above, this functionality may be made available through a standard platform management interface, such as IPMI.

It should be appreciated that the software components described herein may, when loaded into the CPU 722 and executed, transform the CPU 722 and the overall computer 700 from a general-purpose computing system into a special-purpose computing system customized to facilitate the functionality presented herein. The CPU 722 may be constructed from any number of transistors or other discrete circuit elements, which may individually or collectively assume any number of states. More specifically, the CPU 722 may operate as a finite-state machine, in response to executable instructions contained within the software modules disclosed herein. These computer-executable instructions may transform the CPU 722 by specifying how the CPU 722 transitions between states, thereby transforming the transistors or other discrete hardware elements constituting the CPU 722.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon, such as the management data 112.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the computer 700 may comprise other types of computing devices, including hand-held computers, embedded computer systems, personal digital assistants, and other types of computing devices known to those skilled in the art. It is also contemplated that the computer 700 may not include all of the components shown in FIG. 7, may include other components that are not explicitly shown in FIG. 7, or may utilize an architecture completely different than that shown in FIG. 7.

Based on the foregoing, it should be appreciated that an extensible management server and related components have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A system for executing scripts to retrieve and set management data at a plurality of managed server computers, the system comprising:
    a management application configured for execution on a client computer; and
    a server computer configured with a management interface, a scripting engine, and a data store having a plurality of management scripts and a management class library stored therein, and
    wherein the management interface is configured to receive and respond to requests from the management application to execute the management scripts by way of the scripting engine,
    wherein the management class library has a plurality of management classes communicating with one or more managed computer systems;
    wherein the management scripts are specific for the management classes and configured to instruct the scripting engine to execute the management classes,
    wherein the scripting engine is configured to execute a selected management class of the management class library as instructed by the management scripts, and
    wherein the selected management class is configured to obtain a handle to access at least one of the managed computer systems and to retrieve management data from the accessed at least one managed computer system.

2. The system of claim 1, wherein the management interface is further configured to receive a request from the management application to add a new management script to the data store and, in response thereto, to cause the new management script to be stored in the data store.

3. The system of claim 2, wherein the management interface is further configured to receive a request from the management application to delete a management script from the data store and, in response thereto, to cause the management script to be deleted from the data store.

4. The system of claim 3, wherein the management interface is further configured to receive a request from the management application for a listing of the management scripts stored in the data store and, in response thereto, to provide the listing of the management scripts stored in the data store to the management application.

5. The system of claim 4, wherein the management interface is further configured to receive a request from the management application for a management script stored in the data store and, in response thereto, to provide the requested management script to the management application.

6. The system of claim 5, wherein each management script stored in the data store comprises a package name, a script name, a script description, a creation date, an author list, a list of arguments to the management script, a list of data returned by the script, and script code for implementing the management script.

7. The system of claim 6, wherein the management class library comprises one or more classes for obtaining management data from an event log of one or more of the managed computer systems.

8. The system of claim 7, wherein the management class library further comprises one or more classes for obtaining management data regarding a field replaceable unit of one or more of the managed computer systems.

9. The system of claim 8, wherein the management class library further comprises one or more classes for obtaining the management data regarding a power supply of one or more of the managed computer systems.

10. The system of claim 9, wherein the management class library further comprises one or more classes for obtaining the management data regarding a cooling component of one or more of the managed computer systems.

11. A non-transitory computer-readable medium having computer-executable instructions stored thereon which, when executed by a computer, cause the computer to:
expose a management interface for use by a management application;
receive a request at the management interface from the management application to execute a management script stored in a data store; and
in response to receiving the request, to cause the management script to be executed thereby executing one or more classes of a management class library stored in the data store to retrieve management data from one or more managed computer systems, wherein the management class library has a plurality of management classes communicating with the one or more managed computer systems, wherein the management script is specific for the management classes and configured to execute the management classes to obtain a handle to access the one or more managed computer systems.

12. The computer-readable medium of claim 11 having further computer-executable instructions stored thereupon which, when executed by the computer, cause the computer to:
receive a request from the management application to add a new management script to the data store; and
to cause the new management script to be stored in the data store in response to receiving the add request.

13. The computer-readable medium of claim 12 having further computer-executable instructions stored thereupon which, when executed by the computer, cause the computer to:
receive a request from the management application to delete a management script from the data store; and to
cause the management script to be deleted from the data store in response to receiving the delete request.

14. The computer-readable medium of claim 13 having further computer-executable instructions stored thereupon which, when executed by the computer, cause the computer to:
receive a request from the management application for a listing of management scripts stored in the data store; and
to provide the listing of the management scripts stored in the data store to the management application in response to receiving the listing request.

15. The computer-readable medium of claim 11, wherein each management script stored in the data store comprises a package name, a script name, a script description, a creation date, an author list, a list of arguments to the management script, a list of data returned by the script, and script code for implementing the management script.

16. The computer-readable medium of claim 11, wherein the management class library comprises one or more classes for obtaining management data from an event log of one or more of the managed computer systems, one or more classes for obtaining management data regarding a field replaceable unit of one or more of the managed computer systems, one or more classes for obtaining the management data regarding a power supply of one or more of the managed computer systems, and one or more classes for obtaining the management data regarding a cooling component of one or more of the managed computer systems.

17. A method for executing scripts to retrieve and set management data at a plurality of managed server computers, the method comprising:
exposing a management interface for use by a management application;
receiving a request at the management interface from the management application to execute a management script stored in a data store; and
in response to receiving the request, causing the management script to be executed, thereby executing one or more classes of a management class library stored in the data store to retrieve management data from one or more managed computer systems, wherein the management class library has a plurality of management classes communicating with the one or more managed computer systems, and wherein the management script is specific for the management classes and configured to execute the management classes to obtain a handle to access the one or more managed computer systems.

18. The method of claim 17, further comprising:
receiving a request from the management application to add a new management script to the data store; and
causing the new management script to be stored in the data store in response to receiving the add request.

19. The method of claim 18, wherein each management script stored in the data store comprises a package name, a script name, a script description, a creation date, an author list, a list of arguments to the management script, a list of data returned by the script, and script code for implementing the management script.

20. The method of claim 19, wherein the management class library comprises one or more classes for obtaining management data from an event log of one or more of the managed computer systems, one or more classes for obtaining management data regarding a field replaceable unit of one or more of the managed computer systems, one or more classes for obtaining the management data regarding a power supply of one or more of the managed computer systems, and one or more classes for obtaining the management data regarding a cooling component of one or more of the managed computer systems.

21. The system of claim 1, wherein the management classes and the managed computer systems are configured to communicate through Intelligent Platform Management Interface.

22. The system of claim 1, wherein the management scripts are configured to instruct the scripting engine to execute a first class of the management classes to obtain handles to at least two of a database, a device, a sensor, an event log, a FRU component, power control, OBSM power management, and OBSM cooling management.

23. The system of claim 22, wherein a first management script is configured to instruct the scripting engine to execute the first class to obtain a handle to a database, and wherein a second management script is configured to instruct the scripting engine to execute the first class to obtain a handle to a sensor.

* * * * *